May 9, 1950     D. W. SHERWOOD     2,507,321
LEAK TESTING DEVICE
Filed April 25, 1946
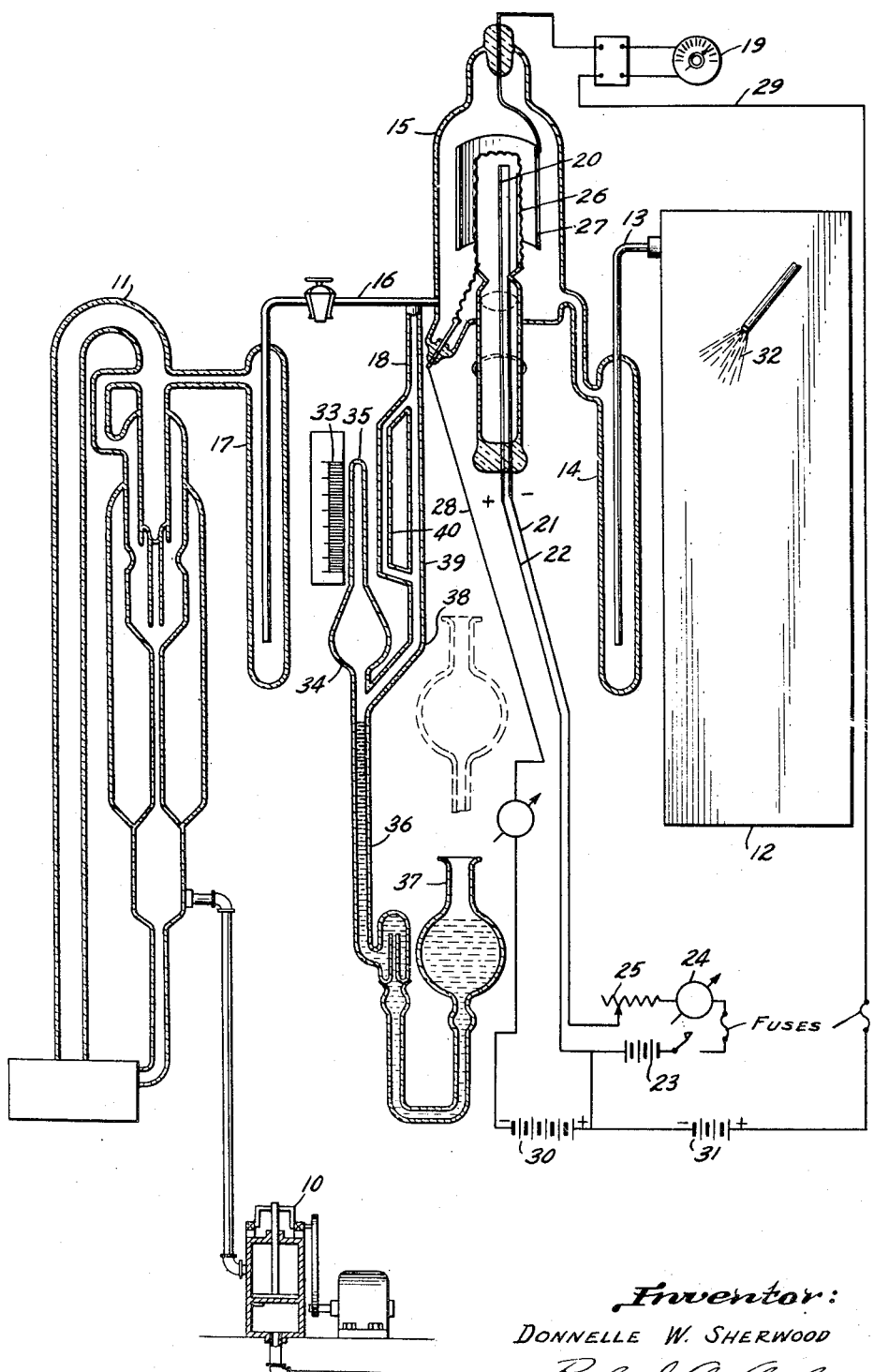
Inventor:
DONNELLE W. SHERWOOD
By Roland A. Anderson
Attorney:

Patented May 9, 1950

2,507,321

UNITED STATES PATENT OFFICE 2,507,321

LEAK TESTING DEVICE

Donnelle W. Sherwood, Seattle, Wash., assignor to the United States of America as represented by the United States Atomic Energy Commission Application April 25, 1946, Serial No. 664,830

3 Claims. (Cl. 73—40)

This invention relates to an improved leak detector for closed systems and more particularly to an improved testing device incorporating a method and arrangement of apparatus using ionic and non-ionic gauges in linear alignment and on a comparative or relative basis of pressure and change of composition of the gas or gases which are being withdrawn from an evacuated system to determine the position and relative size of leakage thereinto.

In general, evacuated systems may be tested for leakage by any one of a number of definite methods more or less involving the introduction of pressure into the system and submersing it in a liquid or coating the system with a liquid and soap solution to note the points of escapage, or otherwise it may be evacutaed and the outside covered with one or more agents which register on a testing device to indicate the entry of the material from outside the apparatus or resultant lowering of pressure by coverage of the point or points of leakage.

Ordinarily, in testing the apparatus by evacuating it, the system is evacuated to the lowest pressure possible and its outside is covered with either a plugging material as liquids which solidify when coated thereover or agents which pass through the points of leakage as liquids or gases and vary or alter readings on ionization or luminous gauges to indicate a change of composition of the gases withdrawn from the system. Generally however, whenever there is a change of pressure in the system not due to leakage these gauges will likewise indicate a change in reading so that the absolute presence of a leak or its relative size is oftentimes not properly determined.

It is therefore an object of this invention to provide an improved method of determining leaks in an evacuated system.

It is an additional and further object of this invention to provide an improved testing device incorporating the combination of a conventional ionization gauge and a non-ionization gauge whereby a comparative reading of pressures and composition changes may be made of the gases withdrawn from an evacuated system.

It is a further object of this invention to provide a novel linear arrangement of a plurality of gauges and associated traps for placement in the extraction line of an evacuated system for leak testing purposes.

Primarily, as herein disclosed, the problem in determining the points of leakage in an evacuated system is a measurement of the lowest pressure possible to which a system may be evacuated by one or more pumps and the comparative differences in change of composition without a change in pressure of the evacuated gas caused by introduction of an indicator from without the system at one or more points of leakage. Further, it must be noted that these gauges are secondarily effected by changes in pressure in the system due to one cause or another which may or may not arise from leakage. That is, the ordinary non-ionic pressure gauge in the present system is set up with an ionic gauge in the extraction line between the system to be evacuated and evacuating pump or pumps by which the system is exhausted in order to determine relative change of pressure, if any, and the composition or ionization of the gas passing through the system.

These gauges are calibrated together under initial conditions, so that the pressure corresponding with each given condition is known. The two gauges will then give equivalent readings when a system in which they are installed is evacuated, whether or not the system is in equilibrium and with or without leakage.

The accompanying drawing and the following description illustrates the leak testing device of my invention of which modification and substitutions will be apparent.

A conventional evacuating pump 10 cooperatively associated with mercury pump 11 in the conventional manner is connected to an evacuated system 12 through extraction line 13 feeding into trap 14 which may be cooled in any suitable and conventional manner to liquefy condensible gases withdrawn from the system but not the ionizable gas as it is to be drawn through the ionization gauge 15 from trap 14 thence through extraction line 16 into a second trap 17 which is similar to the trap 14 to further eliminate condensible gases and even an ionizable gas, if desired, from passage into pump 10 by maintaining a lower temperature about the second trap 17. Connected between the ionization gauge 15 and trap 17 in extraction line 16 is a non-ionization pressure gauge, commonly termed a McLeod gauge, associated with conduit 18. If desired, the trap 14 may be eliminated without causing appreciable change in the comparative gauge readings.

The ionization gauge 15 is a conventional triode tube which measures with galvanometer 19 the positive ions that are formed in the electric field of the gauge when the withdrawn ionizable gas is bombarded with electrons. This gauge 15 and its associated circuit may be of a conventional type consisting of filament 20 carrying a current through feed lines 21 and 22 from battery 23, ammeter 24 including a suitable fuse, and resistance 25. Electrons emitted from the filament are accelerated to the grid 26, and their momentum would carry them to the plate 27 if an inverse field more than sufficient to prevent this were not imposed between the grid and the plate by feed lines 28 and 29 from conventional batteries 30 and 31. The electrons while they are between the grid 26 and plate 27 bombard and ionize molecules of the gas passed into the evacuated system by the scanning spray 32. These ions are collected on the plate 27 and the ratio of the grid current changes are indicated on the galvanometer 19 in proportion to the amount of ionizable gas entering the system through a leak over which the scanning spray 32 passes, to indicate the exact location and relative size of leaks in the evacuated system 12.

The gauge 18 is a McLeod gauge which is reactive directly to the pressure in the system and depends upon a volume of residual gas being compressed, so that as the system is evacuated the pressure of the compressed volume is increased to a value at which the hydrostatic head of mercury can be measured with an ordinary scale. The gauge conduit 18 is also a conventional apparatus which may be mounted on a vertical board and consists of a calibrated pressure scale 33, a bulb 34 of measured volume $V_1$, this bulb is closed at one end by capillary tube 35 and open at its base into tubular passage 36 and adapted to be filled from reservoir 37. Adjacent the base of bulb 34 in passage 36 is a tube 38 formed into a Y-branch tubing 39 and 40 joining tube 18 in the evacuating line of the apparatus. The tube 40 is a capillary of the same nature as capillary tube 35. With the reservoir 37 at its lower position the bulb 34 is exposed to the pressure condition in extraction line 16, so that as the reservoir 37 is raised the mercury level in the gauge comes above the Y-branch, thus isolating a definite volume $V_1$ of the residual gas in the apparatus to which the gauge is connected. As the mercury gauge is further raised, the isolated residual gas is compressed in capillary tube 35, and when its volume has been reduced to a volume $V_2$, the pressure is great enough to produce a sensible difference in the height of the mercury meniscus in the two capillaries 35 and 40. In accordance with the usual method of determining the pressure in the system the meniscus in tube 40 is adjusted to the same height as the top of capillary 35, then the final volume, $V_2$, in capillary 35 is expressed as a direct reading of the pressure in evacuated system on scale 33. It will be obvious that equivalent gauges for the direct reading of pressure may be used in place of the McLeod gauge above described.

In the ordinary commercial systems, pressures to be maintained are in the neighborhood, for example, of from 4 mm. to 100 mm. of mercury absolute so that evacuation is made of the system tested for leaks at a relatively greater pressure than that at which the gauges are made to operate under critical conditions. That is, by installation of the unit of gauges a useful and satisfactory determination of the existence of leaks in the ordinary commercial system has been made. Particularly is this true wherein the evacuating pump 10 with or without the aid of mercury pump 11 is used to evacuate a system through, for example, an extraction line 13 with an installed unit comprising trap 14 and extraction line 16 which passes extracted gas or gases through ionization gauge 15, past McLeod gauge 18 and into trap 17 likewise cooled to prevent diffusion of mercury or other alien substances into the system or particularly passage of condensible gases into the pump or pumps.

When a system has been evacuated, the two gauges as heretofore stated, initially give the same reading. Now in order to determine the relative area and location of leaks in the evacuated system, a jet of suitable gas, as diethyl ether, carbon dioxide, argon, and helium or the like is sprayed over the various parts of the system in sequence while observing if changes occur on the readings of the two gauges. When the jet strikes the apparatus at the point where there is a leak, the ionizable gas will be drawn into the system and passes through the ionization gauge en route to the pumping apparatus. When the ionizable gas, varying in composition from gas in the system passes through the ionization gauge the reading thereon will suddenly vary from that shown by the McLeod gauge which continues to read the actual pressure. The position of the jet of the scanning ionizable gas which causes a change in the reading of the ionization gauge without a change in the McLeod gauge reading will indicate the location of a leak in the system even though there may be other leaks. By continuing the spray of ionizable gas over the surface of the system other leaks will likewise be indicated on the ionization gauge without registering on the McLeod gauge. Further the extent of the reading and the measure of change produced on the ionization gauge can be fairly accurately determined by rescanning the leak with ionizable gas and rechecking the gauge which indicates the relative size or area of the leaks in the system by the relative variable deflection of the galvanometer reading.

In the event that there is an apparent reading on the ionization gauge, which is likewise registered on the McLeod gauge it will be obvious that the pressure variation may be due to some change in the system which is not responsible to the leak and therefore may be disregarded as such with other means being taken to discover wherein the pressure change is caused.

From the above it will be apparent that I have devised the embodiment of an ionization type pressure gauge and a non-ionization type pressure gauge in combination to detect one after another, the presence and location of leaks in an evacuated system. This combination may obviously be used efficiently, practically, and economically for the testing of large commercial systems which are to be operated at a lower pressure than normal atmospheric or as normally closed systems.

Since many embodiments might be made of the present invention and since many changes might be made in the embodiment described, it is to be understood that the foregoing description is to be interpreted as illustrative only and not in a limiting sense.

I claim:

1. The method of testing an evacuated apparatus for leaks comprising the steps of measuring the pressure in said apparatus with an ionization gauge, contemporaneously measuring the pressure in said apparatus with a non-ionic pressure gauge, scanning said apparatus with a jet of gas having ionization characteristics different from those of air, whereby said gas will be drawn through any leaks that may exist in said apparatus and cause said ionization gauge and said non-ionic gauge to indicate different readings, and determining the magnitude of the difference in readings between said two gauges as a measure of the magnitude of said leak.

2. The method of testing an evacuated apparatus for leaks comprising the steps of measuring the pressure in said apparatus with an ionization gauge, contemporaneously measuring the pressure in said apparatus with a non-ionic pressure gauge, scanning said apparatus with a jet of gas having ionization characteristics different from those of air, whereby said gas will be drawn through any leaks that may exist in said apparatus and cause said ionization gauge and said non-ionic gauge to indicate different readings, observing the location of said jet when said gauges indicate different readings to determine the position of said leak, and determining the magnitude of the difference in the readings of said two gauges as a measure of the magnitude of said leak.

3. The method of testing for leaks an apparatus that is being continuously evacuated by withdrawing gases from the interior of said apparatus with a vacuum pump which comprises causing at least a portion of the gases leaving said apparatus to flow through an ionization gauge to said vacuum pump, measuring the pressure of said gases with a non-ionic gauge at a point adjacent said ionization gauge, scanning said apparatus with a jet of gas having ionization characteristics different from those of air, whereby said gas will be drawn through any leaks that may exist in said apparatus and cause said ionization gauge and said non-ionic gauge to indicate different readings, and observing the location of said jet when said gauges indicate different readings to determine the position of said leak.

DONNELLE W. SHERWOOD.

REFERENCES CITED

The following references are of record in the file of this patent:

UNITED STATES PATENTS

| Number | Name | Date |
| --- | --- | --- |
| 1,372,798 | Buckley | Mar. 29, 1921 |
| 1,508,242 | Partzsch | Sept. 9, 1924 |
| 1,566,279 | King | Dec. 22, 1925 |